United States Patent [19]
Woodruff

[11] 3,744,400
[45] July 10, 1973

[54] ATTACHMENT FOR TENDERIZING MEAT

[76] Inventor: Oscar G. Woodruff, 404 N. Oro St., Stockton, Calif. 95205

[22] Filed: Oct. 27, 1971

[21] Appl. No.: 192,886

[52] U.S. Cl. ................................................. 99/345
[51] Int. Cl. ............................................. A47j 37/10
[58] Field of Search ..................... 99/345, 346, 347; 222/420, 422, 545; 239/37, 38, 40, 41, 42

[56] References Cited
UNITED STATES PATENTS

| | | | |
|---|---|---|---|
| 1,261,878 | 4/1918 | West | 126/380 X |
| 1,380,656 | 6/1921 | Lauth | 99/345 X |
| 1,460,486 | 7/1923 | Harvey | 99/345 |
| 1,546,343 | 7/1925 | Hare | 222/545 |
| 2,132,609 | 10/1938 | Ellinger | 126/380 |
| 2,517,167 | 8/1950 | Bemis | 126/380 X |
| 2,873,886 | 2/1959 | Miskel et al. | 222/545 X |
| 2,874,881 | 2/1959 | Stull | 222/545 X |
| 3,596,590 | 8/1971 | Harris | 99/345 |

*Primary Examiner*—Billy J. Wilhite
*Attorney*—David Paul Weaver et al.

[57] ABSTRACT

A meat tenderizer attachment that is secured to the lid of a frying pan. The attachment incorporates a bolt that extends through a hole in the lid and that secures a tank to the top of the lid and a hollow stem to the bottom of the lid. A bore extending through the bolt enables liquid in the tank to flow from the tank through the bolt and the stem towards the pan.

5 Claims, 4 Drawing Figures

PATENTED JUL 10 1973   3,744,400

INVENTOR
OSCAR G. WOODRUFF
BY
Kimmel, Crowell & Weaver
ATTORNEYS

ATTACHMENT FOR TENDERIZING MEAT

BACKGROUND OF THE INVENTION

In the frying of meat, the quality of the cooked product is dependent on the quality of the meat. This invention is concerned with an attachment for tenderizing the meat while it is being fried so that cheaper cuts of meat can be utilized to provide a tasty cooked product.

SUMMARY OF THE INVENTION

The invention is utilized in conjunction with the frying of the meat in a closed compartment, such as is formed by a lid placed on a frying pan. One aspect of the invention relates to the tenderizing of the meat while it is being fried in the oil in the compartment by dispensing liquid onto the oil so as to form steam in the compartment.

A second aspect of the invention is concerned with a tenderizer attachment for dispensing the liquid. The attachment includes a tank that stores the liquid and a stem through which the liquid is dispensed. The liquid passes from the tank to the stem through a bore in a fastening member that extends through aligned holes in the lid and the tank. The fastening member is so constructed as to secure the tank to the top of the lid and the stem to the bottom of the lid.

DESCRIPTION OF THE PREFERRED EMBODIMENTS

Figure 1:
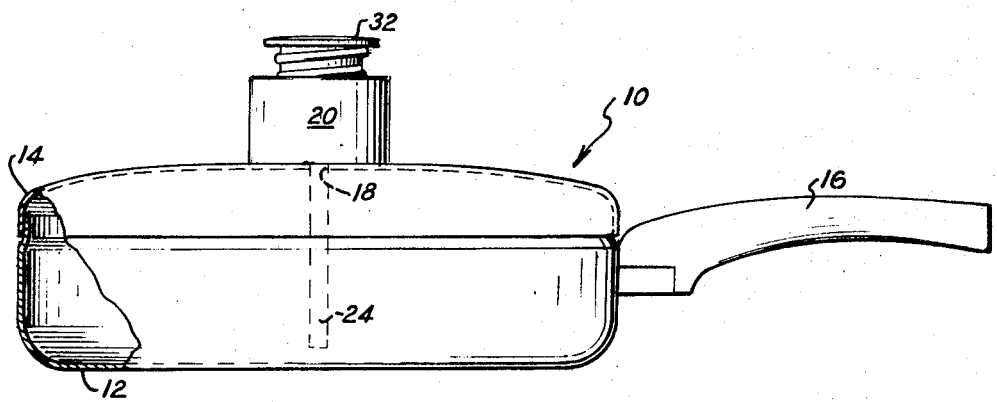
FIG. 1 is a view of the frying pan, the lid, and the tenderizer attachment.

A fryer assembly 10 comprises a pan 12 and a lid 14 fitted onto the top of the pan to form a closed compartment. A handle 16 is secured to the pan 12. The lid has a hole 18 extending through its top that usually accommodates a bolt for securing a handle to the lid.

A tank 20 is mounted on the top of the lid 14 by means of a fastening member in the form of A bolt 22 that extends through the hole 18 and a hole in the bottom of the tank. The shank of the bolt, below the lid 14, is threaded into a hollow stem 24 to thereby secure the tank 20 and the stem 24 to the lid 14. Washers 26, 28, and 30 are provided to effect a tight securement of the tank 20 and the stem 24 to the lid 14. A cap 32 is threaded onto the open top of the tank 20.

Figures 2, 3, 4:
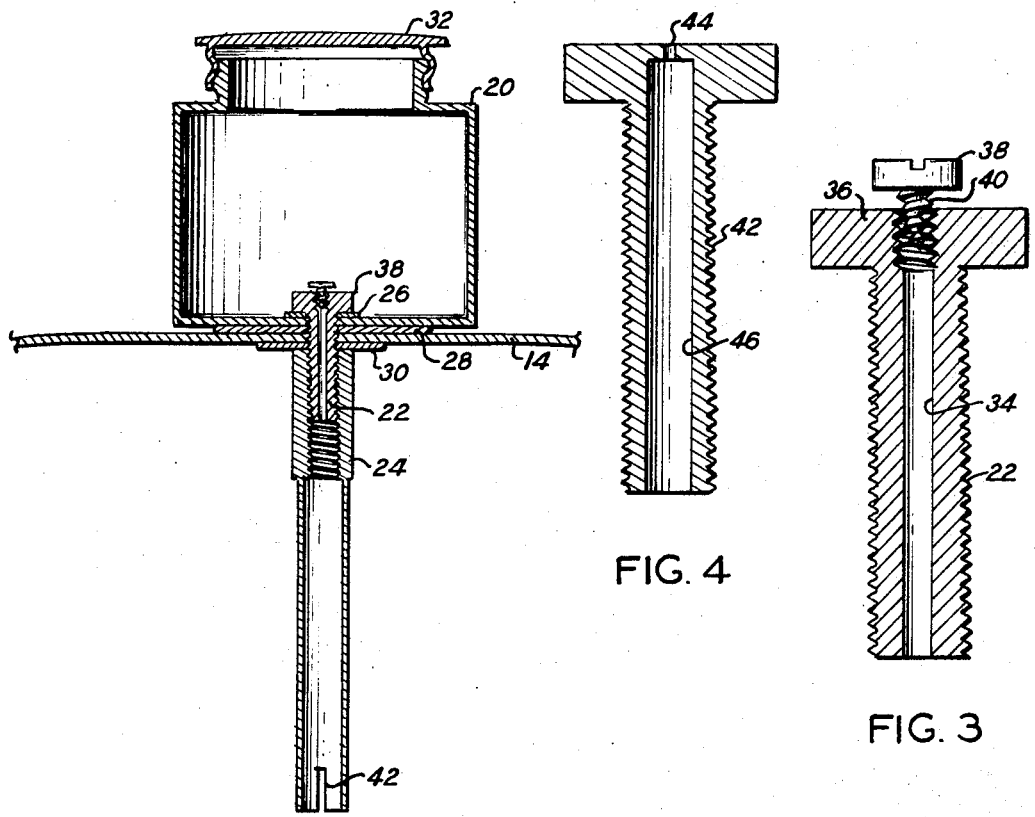
FIG. 2 is a sectional view, to an enlarged scale, of the tenderizer attachment.
FIG. 3 is a section of the fastening member.
FIG. 4 is a section of a variant of the fastening member.

As shown in FIG. 3, the bolt 22 has a bore 34 extending therethrough that has a uniform diameter thread at its upper end in the region of the bolt head 36. A screw 38 is threaded into the bore 34. The shank 40 of the screw is tapered from a maximum diameter at the head of the screw to a minimum diameter at the lower end of the shank remote from the head. Thus, the further the screw 38 is threaded into the bore 34, the less clearance there is between the periphery of the screw shank 40 and the bore 34.

The stem 24 has a slot 42 extending lengthwise thereof that intersects the bottom end of the stem that is remote from the bolt 22.

The tank 20, bolt 22 and stem 24 form a tenderizer attachment that is mounted to the lid, as described above, through the hole 18 that is conventionally provided in the lid 14. When using the tenderizer attachment, the meat to be fried and oil are placed in the pan 12. The lid 14 is placed on the pan 12 and the tank 20 is filled with water or wine. The pan 12 is heated in the usual manner. The liquid in the tank 20 passes between the screw 38 and the bore 34 to the bottom of the stem 24 into the oil to thus produce steam in the compartment formed by the pan 12 and the lid 14, thus tenderizing the meat. Depending on the setting of the screw 38 in the bore 34, the liquid flows down the stem 24 at a rate of from 2 drops per minute to 60 drops per minute. Should the bottom of the stem 24 be resting on a piece of meat and thus block the flow of the drops of liquid onto the oil through the bottom of the stem, the liquid can flow through the slot 42 onto the oil.

After the meat has been cooked for a time suited to an individual's taste, the cooked and tenderized meat is removed from the pan and served.

FIG. 4 shows a bolt 42 that may be used in the place of the bolt 22. The bolt 42 has a small diameter bore 44 in its head that joins a larger diameter bore 46 that extends from the bore 44 to the bottom of the bolt 42. With this arrangement, liquid can be dispensed from the tank 20 through the stem 24 for about an hour when the tank is full at a rate that commences at about 30 drops per minute and diminishes to about 22 drops per minute as the tank is emptied.

The stem 24 may be made of varying lengths to suit the depth of the pan 12.

I claim:

1. In a fryer assembly that comprises: a pan; a lid fitted onto the top of the pan to form a closed compartment therewith; and a hole extending through the lid; a tenderizer attachment that comprises: a tank located above the lid, adapted to contain a quantity of liquid, having a hole in alignment with the lid hole; a hollow stem located below the lid and extending downwardly toward the pan; a fastening member, extending through the holes and connected to the stem, so constructed and arranged as to secure the tank to the top of the lid and the stem to the bottom of the lid; and a bore extending through the fastening member to provide for flow of the liquid from the tank to the stem.

2. The tenderizer attachment of claim 1 further comprising: a slot extending upwardly of the bottom end of the stem.

3. The tenderizer attachment of claim 1 wherein said fastening member is a bolt having a head and a threaded shank and wherein the bolt head is located above the bottom of the tank and the bolt shank is threaded into the stem.

4. The tenderizer attachment of claim 1 wherein a thread of uniform diameter is formed at the upper end of the bore, and wherein a screw having a tapered shank whose diameter diminishes as it extends downwardly is threaded into said thread, whereby the rate of flow of the liquid through the bore is determined by the setting of the screw in the bore.

5. The tenderizer attachment of claim 1 wherein said bore is of a relatively small diameter at its upper end and wherein the remainder of the bore is of relatively large diameter.

* * * * *